(12) United States Patent
Simm

(10) Patent No.: US 9,969,565 B1
(45) Date of Patent: May 15, 2018

(54) PICK AND PLACE APPARATUS FOR ORIENTATION AND HOLE HEALING APPLICATION

(71) Applicant: R.A Jones & Co., Covington, KY (US)

(72) Inventor: Thorsten Simm, Florence, KY (US)

(73) Assignee: R.A Jones & Co., Covington, KY (US)

( * ) Notice: Subject to any disclaimer, the term of this patent is extended or adjusted under 35 U.S.C. 154(b) by 0 days. days.

(21) Appl. No.: 15/499,231

(22) Filed: Apr. 27, 2017

(51) Int. Cl.
  *B65G 47/26* (2006.01)
  *B65G 47/244* (2006.01)
  *B65G 47/68* (2006.01)
  *B65G 47/91* (2006.01)

(52) U.S. Cl.
  CPC ......... *B65G 47/261* (2013.01); *B65G 47/244* (2013.01); *B65G 47/681* (2013.01); *B65G 47/912* (2013.01)

(58) Field of Classification Search
  CPC .. B65G 47/848; B65G 47/244; B65G 47/681; B65G 47/918; B65G 47/912; B65G 47/82; B65G 47/26
  USPC ......... 198/418.1, 429, 432, 433, 468.4, 399, 198/401; 53/498, 154
  See application file for complete search history.

(56) References Cited

U.S. PATENT DOCUMENTS

| | | | | |
|---|---|---|---|---|
| 3,225,891 A * | 12/1965 | Hickin | ................... | B65B 35/38 198/429 |
| 3,805,943 A * | 4/1974 | Warren | ................... | B65B 23/08 198/412 |
| 3,920,128 A * | 11/1975 | Baker | ...................... | A21B 3/18 198/468.4 |
| 4,199,050 A * | 4/1980 | Moller | ................... | B65B 21/20 198/429 |
| 5,636,726 A * | 6/1997 | Nield | ..................... | B65G 47/83 198/430 |
| 5,899,341 A * | 5/1999 | Irita | ..................... | B65G 47/918 209/571 |
| 5,942,188 A * | 8/1999 | Lepper | .................. | B65B 25/008 198/340 |
| 8,104,602 B2 * | 1/2012 | Sirocchi | ............... | B65G 47/082 198/432 |
| 2010/0032262 A1 * | 2/2010 | Im | ...................... | G01R 31/2893 198/401 |

* cited by examiner

Primary Examiner — James R Bidwell
(74) Attorney, Agent, or Firm — Wood Herron & Evans LLP

(57) ABSTRACT

Article packaging apparatus includes a multiple lane article infeed, first and second transfers, an intermediate article orientation station and an article group discharge conveyor. The first and second transfers have respective article grippers expansible and contractible toward and away from one another while the intermediate article orientation station includes article rotating trays spaced further apart then the lanes of the article infeed.

18 Claims, 19 Drawing Sheets

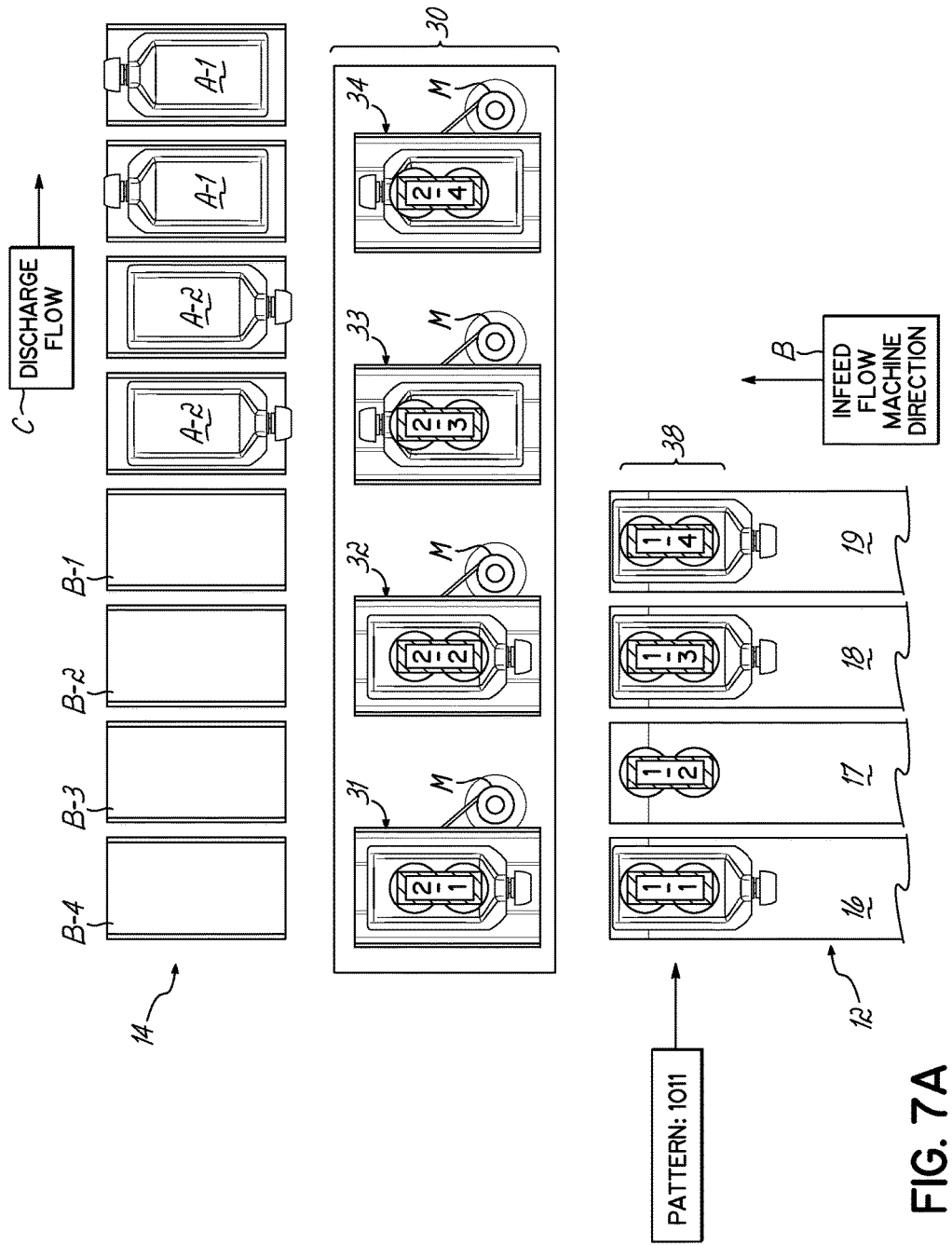

PICK AND PLACE APPARATUS FOR ORIENTATION AND HOLE HEALING APPLICATION

FIELD OF THE INVENTION

This invention relates to article handling where articles in multiple article supply lanes are transferred, preferably in groups into an article conveyor for packaging, with incoming articles selectively re-oriented, and where empty article positions in the process are filled, thus providing a hole healing function.

BACKGROUND OF THE INVENTION

In packaging systems it is common to convey articles in multiple article infeed lanes and to form groups of infed articles into conveyors for downstream packaging. While many systems so operate, article infeed and article grouping for downstream packaging present major article handling concerns. Three of these present significant article handling problems arising, for example, from the article shape, from the respective article orientation in the desired, formed groups and from the manner or pattern in which the articles are fed along the multiple article infeed lanes.

In particular, articles may not be symmetrical but can be of asymmetrical shapes. Orientation of such adjacent articles with respect to each other in a group is critical to meet ultimate packaging goals such as desired optimal nesting of adjacent articles in a package of smallest possible size for the number of articles therein. Also, carton or package cutouts to showcase a feature of the product may require article re-orientation from the original orientation of the article being fed from the multiple lane supply. Thus where such articles are fed in multiple article infeed lanes, even if initially in the same orientation, relative article orientation in final packaging positions may require article re-orientation during the article handling in a packaging system.

For example, articles might be oblong with either narrow edge leading or broad edge leading in the multiple article infeed lanes. Ultimate packaging may require two respective adjacent articles with these ends either aligned or juxtaposed in adjacent position. Articles of such configuration, by way of example, may be pouches, bars, trays or the like. Where articles are supplied in multiple lanes, the spacing of side-by-side or parallel lanes complicates or hinders re-orientation of supplied articles, particularly where lanes are so closely spaced side-by-side that turning any article may interfere with an adjacent article.

Another article handling problem has arisen where there are gaps, or missing articles in article infeed streams or lanes. More particularly, it is preferable that each infeed or stream or lane is filled with a succession or seriatim of articles one after another at predetermined sequence or pitch positions and without a missing article at any anticipated pitch position. Absence of even one article in an anticipated or expected pitch position results in a downstream incomplete article group emanating from the transfer region or in a completed (except for the article omission) group. This results in incomplete article groups for packaging, in rejection or waste of the incomplete article group, or in additional article make-up expense.

Several methods are known to meet these difficulties. Very often customers would have had to accept the waste of the good product in incomplete groups in order to save equipment cost and/or floor space for complex solutions. Another solution, for example, has been the use of additional pre-filled magazines and conveyor sections to automatically replenish missing articles or product. Another prior solution is the addition of a load station where an operator manually loads missing product or articles at lower machine speeds and through-put.

Accordingly it has been an objective of the invention to provide apparatus and methods for both properly orienting articles in groups for packaging and for providing complete article groups for packaging where article infeed is inconsistent, and doing so without waste or additional expense.

Another objective of the invention has been to provide apparatus and methods for re-orienting articles from a multiple lane article supply into different orientation for downstream packaging.

Another objective of the invention has been to provide apparatus and methods for forming complete article groups, with no missing articles, and from a multiple lane article infeed having inconsistent article spacing.

SUMMARY OF THE INVENTION

This invention contemplates apparatus and methods where articles are fed in multiple adjacent lanes, preferably at predetermined pitch positions but with one or more gaps or holes possible at one or more pitch positions, and in any of the lanes.

A two stage transfer apparatus proximate the end of the multiple adjacent article supply lanes includes first and second article transfers, each having a multiplicity of article gripper sets for gripping articles, lifting articles, expanding or collapsing the space between the grippers and placing the articles. Preferably, the article gripper sets are in the same number as the number of article infeed lanes, and each set is moveable in a machine direction at the same time.

Preferably, the first and second sets of article grippers move simultaneously to respectively lift articles, expand or collapse lifted articles away or toward one another, and to respectively place lifted articles onto of a set of rotatable trays in an intermediate transfer station, or onto buckets of an indexable or moveable bucket conveyor in formed groups of re-oriented articles.

As mentioned above, the intermediate transfer station includes a gang of multiple rotatable trays, each for receiving an article from the first article transfer and selectively rotating articles prior to their engagement by the second article transfer.

Grippers of the second article transfer lift articles whether or not re-oriented, from the intermediate rotatable trays and deposit them into article group buckets in a bucket conveyor for downstream packaging such as in cartoning. The bucket conveyor is indexed or continuously operated to move empty buckets for filling by the second article transfer.

A variety of machine motions are contemplated in the invention respecting the motion of the article infeed supply conveyors and the motion of the article receiving bucket conveyor. These include for each infeed supply and each bucket conveyor combination constant-to-intermittent motion, intermittent-to-constant motion, constant-to-constant motion and intermittent-to-intermittent motion. The rate of the bucket conveyor motion is controlled to accommodate specific article infeed and article transfer conditions.

A wide variety of article infeed parameters and article group parameters are accommodated and contemplated as will be appreciated from this application. For purposes of description and without limitation, this description refers to apparatus and methods comprising four side-by-side article infeed lanes with incoming articles on pitch or multiple pitch positions intended in each lane independent of article positioning in any other lane. For exemplary illustration, in one packaging operation the final grouping of articles is in a series of buckets in a bucket conveyor with same ends of two articles oriented in one direction, and the same ends of the next two articles in another opposite direction. This is but one configuration of incoming articles and formed article groups contemplated.

Thus one embodiment of this invention contemplates multiple streams or lanes of article infeed supply such as in an article supply or infeed multiple lane conveyor, moving in an infeed on a machine direction along an x-axis, an article transfer apparatus with components of motion in directions along an x-axis, along a y-axis transverse to the x-axis, and along a vertical z-axis for article lifting and placing using two rows of groupable product heads. The article transfer apparatus includes a first article Transfer #1 and second article Transfer #2, to manipulate product or articles along an x-axis or direction, into an intermediate orientation station, and into a single lane conveyor for product discharge. The discharging conveyor may be a bucket conveyor, cartoning conveyor or other suitable conveyor. The Transfers include grippers moving along the y-axis for separating articles for re-orientation and for grouping of articles.

More particularly, empty article positions or "holes" (missing articles) in any of the infeed or article supply lanes are cured in the invention by the article transfer apparatus operable to heal the article holes by transferring articles in a unique way. Together with the intermediate orientation station, this serves product conditioning purposes as well as re-orienting or weighing product.

For hole compensation, or "hole healing", empty product heads of the first transfer are collapsible or expandable with respect to each other to feed rotatable buckets of the intermediate station. For product re-orientation the respective bucket(s) of the intermediate transfer station are selectively rotated, thus requiring more space between the adjacent products in y-axis or direction than in the infeed conveyor lanes. That is why the spacing of the trays in the intermediate station is greater than the space between the infeed conveyor lanes in the y-direction.

It will be appreciated that the transfer apparatus of the invention performs two transfer actions within each cycle along the x-direction. That is, the first transfer of the incoming product by the article Transfer #1, from the article supply to the intermediate station and, at the same time and secondly, the transfer of the re-oriented product by the article Transfer #2 from the intermediate station to the discharge conveyor. In one embodiment as shown herein, the article group discharge conveyor is a bucket conveyor. The two leftmost product heads 1-1 and 2-1 on either the respective first and second transfer beam are preferably fixed in the y-direction. The adjacent product heads of each transfer only need to move along the y-axis with respect to each other. This enables the use of pneumatic cylinders. Yet to provide even more flexibility and/or increase transfer speed the use of linear motors to drive the respective transfer heads is in reciprocal directions along the y-axis optional.

The hole compensation process is performed as follows: products are transferred from an infeed conveyor pick-up position to the intermediate station by Transfer #1 then picked up and placed by Transfer #2 into adjacent buckets of the discharge conveyor. Holes within forming product groups are eliminated by expanding or collapsing the respective transfer heads of both Transfers #1 and #2 to feed the bucket conveyor.

Any leading and/or trailing holes in a product group from the intermediate transfer station are compensated by intermittently indexing, or varying the speed of the discharge bucket conveyor. The required number of indexes for example is determined by the current product pattern in Transfer #2 and the bucket conveyor's leftmost bucket status, filled or empty. In other words, buckets of the bucket conveyor are consistently filled with product groups resulting from the combined operations of the infeed supply, Transfer #1, the intermediate re-orientation station, Transfer #2 and the indexable or rate adjustable bucket conveyor.

BRIEF DESCRIPTION OF THE DRAWINGS

FIG. 7A-7E are illustrative top plan views of portions of the apparatus of FIGS. 1 and 2 illustrating its use in handling one exemplary article pattern styled 1011;

The legends provided in FIGS. 8-11 are illustrative of components therein.

It will be appreciated that some of the Figs. omit features or elements of the apparatus of the invention for clarity of particular subject matter illustrated by the Figure.

DETAILED DESCRIPTION OF THE INVENTION

The apparatus embodying this invention is useful in a large variety of packaging and article handling processes. The apparatus will be described in detail herein while several illustrative examples of its use will be provided, but without limitation to its function and use for and in a large variety of article size, shape and orientation configurations, and without limitation to any particular article or article grouping for final packaging. It will be appreciated that the apparatus described herein is capable of use with large variety of incoming articles, article orientation, article re-orientation and article grouping for packaging.

Figure 1:
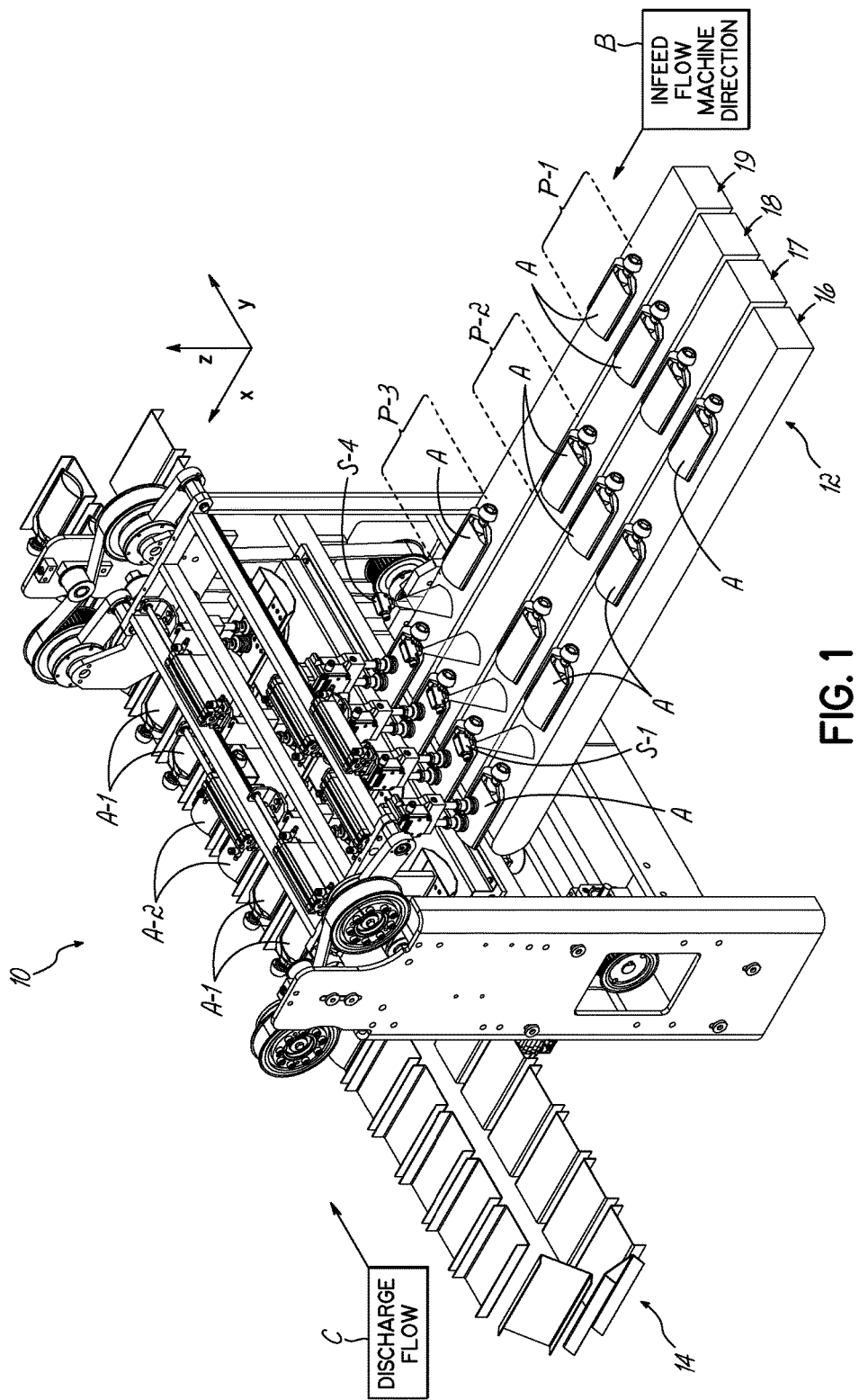
FIG. 1 is an isometric view of a packaging apparatus viewed from the infeed side according to one embodiment of the invention.
Figure 2:
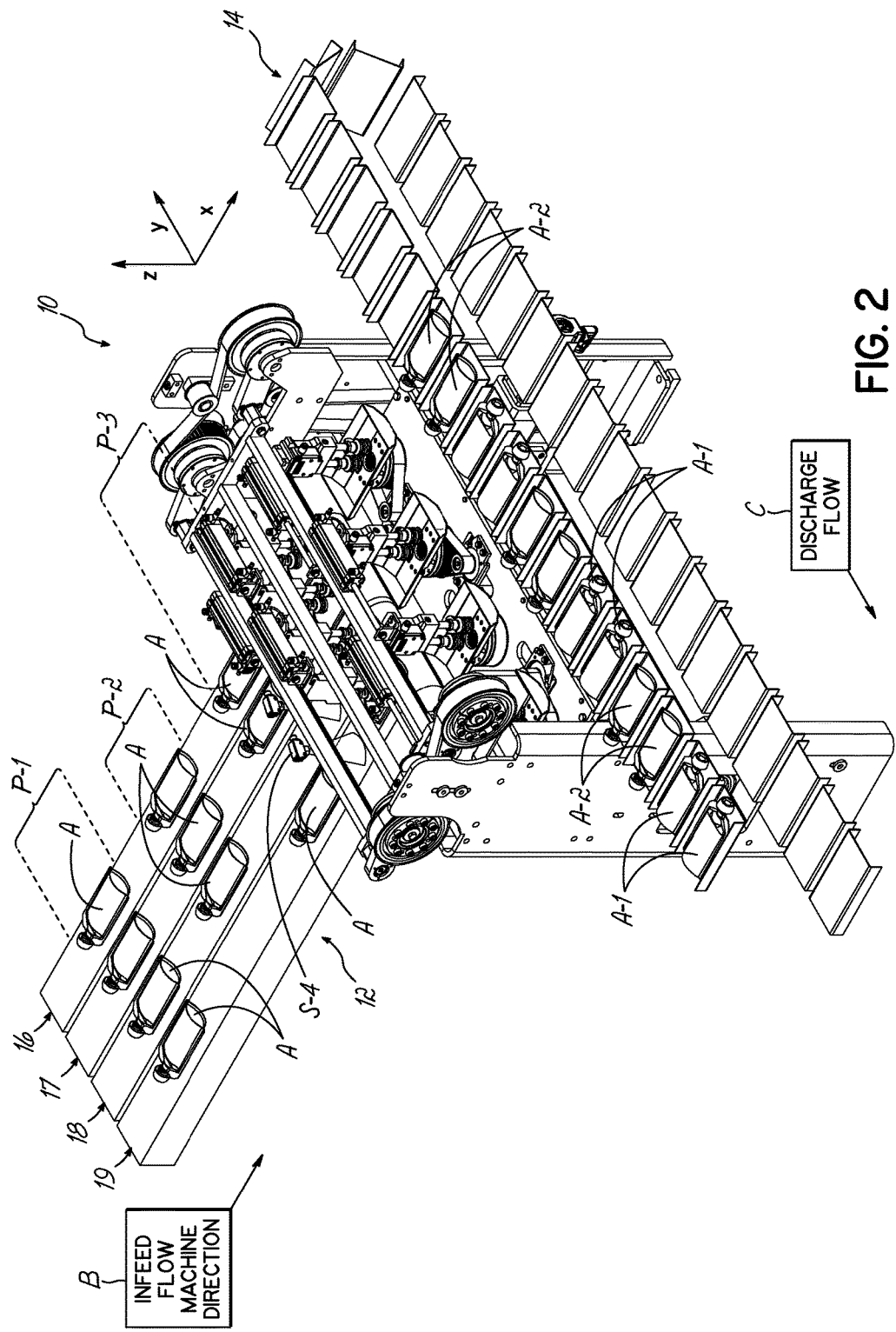
FIG. 2 is an isometric view of the apparatus of FIG. 1 viewed from the discharge side.

Turning to the Figures, there is shown in FIGS. 1 and 2 an article packaging apparatus 10 including a multiple lane article infeed 12 and an article group carrying discharge conveyor 14. As shown for this embodiment, conveyor 14 is a bucket conveyor. The general directions of motion of infeed 12 and bucket conveyor 14 are respectively illustrated by the "INFEED FLOW" B (machine direction) and "DISCHARGE FLOW" C arrows of FIGS. 1 and 2. Infeed flow B is in the machine direction along axis x while discharge flow C is along the y-axis.

Infeed 12 is preferably a multiple lane conveyor having more than one article lane. In this particular embodiment and without limitation, four such lanes 16, 17, 18 and 19 are illustrated for feeding articles A in the direction of the INFEED FLOW B, along x-axis (see FIG. 4). Lanes 16-19 may be defined by separate article-conveying belts or the like, as diagrammatically shown, or lanes 16-19 may be defined, for example, by a single conveyor underlying a plurality of spaced, parallel lane guides or dividers. Alternatively, other numbers of multiple lanes or lane constructions can be provided.

In any event, articles A on infeed 12 may be of any suitable configuration and orientation such as pouches A, as shown, with caps thereon, and with one bottom end leading while the cap end trails as shown in FIGS. 1 and 2. In the Figs., certain discharging sets (DISCHARGE FLOW Arrow C) or groups of articles A-1 are oriented in one direction while certain other groups or articles A-2 are oriented in an opposite direction for discharge, all as will be described.

Figure 4:
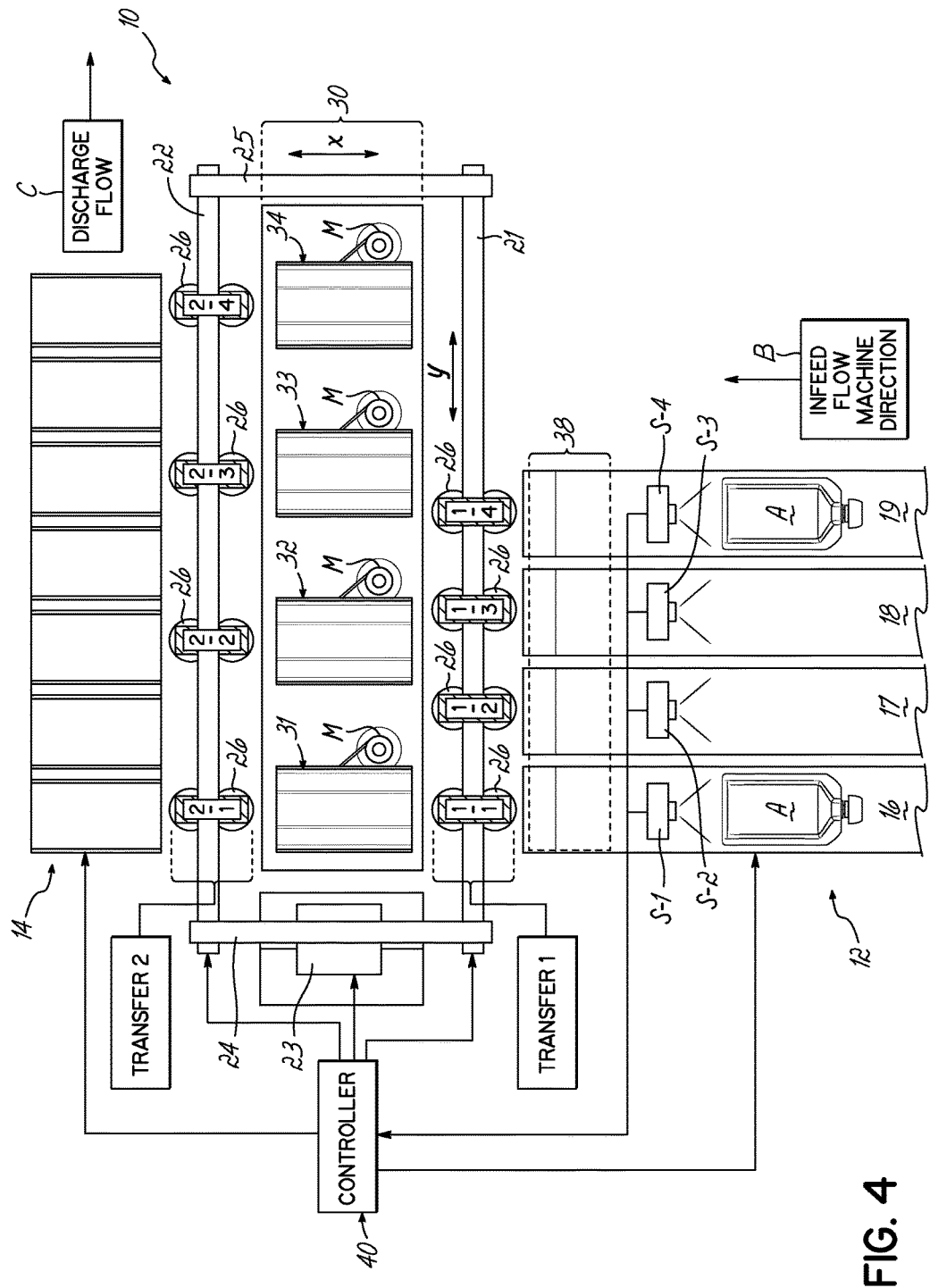
FIG. 4 is an illustrative diagrammatic top plan view of the apparatus of FIGS. 1 and 2 with features omitted for clarity.

Turning momentarily to FIG. 4, apparatus 10 further includes two transfers, Transfer #1 and Transfer #2. Transfer #1 includes a set of four article grippers 1-1, 1-2, 1-3 and 1-4 while Transfer #2 includes a set of article grippers 2-1, 2-2, 2-3 and 2-4. The grippers of each set are mounted on respective guides or rails 21, 22, each carried by any suitable drive mechanism 23 and links 24, 25 for reciprocal motion on an x-axis (or direction). Thus Transfer #1 and Transfer #2 move simultaneously in horizontal directions along the x-axis and along the vertical z-axis.

Respective grippers of Transfer #1 and of Transfer #2 are each movable or translatable along the y-axis, along their respective guides or rails 21, 22 and with respect to each other. This y-axis is perpendicular to x-axis across the machine direction. Preferably grippers 1-1 and 2-1 are each not moveable along the y-axis, but the other grippers of each set are moveable along y-axis toward and away from the other grippers of the set they are in. Thus the grippers of Transfer #1 and of Transfer #2 are expandable or collapsible with respect to each other and within the transfers as will be described.

It will also be appreciated that each gripper of both transfers preferably comprise one or more suction cups 26, two such cups being illustrated in the Figs. in each gripper. The suction cups 26 are preferably extendable and retractable along a vertical axis z (see FIG. 5A for example) to pick up respective articles A, and deposit them as will be described.

Further with reference to FIG. 4, the apparatus 10 includes an intermediate transfer, re-orientation station 30 comprised of a series or gang of rotatable trays, in this case, trays 31, 32, 33 and 34. Generally, the number of trays 31-34 is the same as the number of article infeed lanes 16-19.

Trays 31-34 are rotatable about respective vertical z axes (FIG. 5A) but are not moveable, expandable or collapsible toward or away from one another. The trays 31-34 are selectively and independently rotatable via motor and belt drives M, and generally through a rotation of 180°.

Again with attention to FIG. 4, apparatus 10 includes an article pick-up station 38 at the end of lanes 16-19 over which grippers 1-1, 1-2, 1-3 and 1-4 can be respectively oriented to pick up infeeding articles in the respective lanes.

For purposes of clarity in FIG. 4, Transfer #1 is shown disposed between pick-up station 38 and intermediate station 30, while Transfer #2 is shown between intermediate station 30 and an article place position over discharge conveyor 14.

In operation, Transfer #1 is moveable along the x-axis from a position over pick-up station 38 to a position over the trays of intermediate station 30. At the same time, Transfer #2 is moveable along the X-direction or axis from a position over the trays 31-34 of intermediate station 30 to a position over the buckets of bucket conveyor 14.

Also for purposes of clarity, in FIG. 4 no articles A are depicted on the discharge conveyor 14 or on trays 31-34 of intermediate station 30.

Any suitable controls and drivers to move and operate the elements of apparatus 10 can be used. One such control is graphically illustrated in FIG. 4 and includes a controller 40, operably inter-connected to article sensors S-1, S-2, S-3 and S-4, to drive 23 (for initiating motion of Transfers #1 and #2 along the x-axis) to and along guides or rails 21, 22 for controlling motions of respective grippers 1-2, 1-3, 1-4 and 2-2, 2-3 and 2-4 along the y-axis via gripper drives such as linear motors (not shown) in the grippers, and to an appropriate drive or drives for the discharge bucket conveyor 14.

Sensors S-1, S-2, S-3 and S-4 are of any suitable type, such as photo-cells or other sensors oriented in respective positions over respective article infeed lanes 16-19. These sensors can be oriented proximate to and just upstream from the pick-up station 38 as in FIGS. 1, 2 and 4 or further upstream as in FIG. 5A, for example. If desired these or other sensors not shown can also signal controller 40 respecting orientation of articles A on infeed 12.

These sensors respectively at least sense the presence or absence of an article in an underlying lane 16-19, and a signal indicating that fact is presented to controller 40 for controlling apparatus 10 as will be described.

For the purposes of this disclosure, it is presumed that articles A on infeed 12 are aligned in the same orientation with the same end of each article leading in each lane. Alternatively, as noted above, when articles are disposed on infeed 12 in random orientation, other sensors could be used to provide article orientation information to controller 40 as well.

For clarity, beams of the photo-eye sensors S-1 through S-4 are graphically depicted in FIGS. 1, 2, 4 and 5A.

Finally, with respect to FIGS. 1, 2, 4 and 5 as discussed above, each article infeed lane has the capacity to convey a plurality of articles A seriatim in the direction of the INFEED FLOW (along the x-axis) and at equal spacing or pitch, one to the other following. Thus for purposes of description, four articles A in FIG. 1 are spaced across infeed lanes 16-19 at position or pitch P-1. The next pitch position P-2 shows only three articles A in lanes 16-18, but no article A at pitch 2 in lane 19. The next pitch position P-3 shows articles A only in lanes 16, 17 and 19, but no article A in lane 18. Inclusion of these articles A as noted on infeed 12 is arbitrary only for the purpose of demonstrating that each lane at each pitch position may or may not have an article A present.

If no article A is present at an anticipated position in a lane, and groups of articles A are formed downstream, the absence of such an article will constitute a void or "hole" in the forming group as noted above. Such a void or hole, if not healed according to this invention can lead to the cost, expense and inefficiencies described above.

Moreover, if articles on infeed 12 are of asymmetrical configurations, and/or are in random orientation, the formation of groups of articles in the discharge bucket conveyor is inconsistent and, in various instances, unacceptable.

Operation of the apparatus 10 described above provides solutions to these disadvantages. The following disclosure will first describe the general operation of apparatus 10, and then will describe apparatus 10 in exemplary fashion for a variety of Articles A or patterns thereof on infeed 12, but without limitation.

General Operation

As used herein, reference is made to an x-axis, y-axis and z-axis, which are in x, y and z directions as will be discussed. Apparatus components herein are moveable in reciprocal directions along these axes.

Articles A are conveyed to pick-up station 38. Respective grippers 1-1, 1-2, 1-3 and/or 1-4 of Transfer #1 pick up the articles at station 38. These grippers transfer respective picked articles A over respective trays 31-34 of intermediate station 30, at the same time expanding any picked articles away from each other, in the Y-direction, so they can be deposited in the respective trays 31-34 and the trays rotated selectively to orient the articles for grouping. This expansion provides sufficient article spacing in the Y-direction so selected ones of articles can be rotated without interfering with each other. After placing articles in the trays the grippers of Transfer #1 are lifted and returned reciprocally along x-axis back over pick-up station 38, with the grippers of Transfer #2 moving at the same time over the trays 31-34 of intermediate station 30. Grippers of Transfer #2 then are positioned to engage and lift reoriented (or non-reoriented articles as selected) in the z-axis from trays 31-34, as will be discussed.

When grippers of Transfer #1 pick-up following articles at pick-up station 38 and move into intermediate station 30, the grippers of Transfer #2 move along the x-axis over discharge bucket conveyor 14 where they can deposit articles from trays 31-34 therein. Grippers of Transfer #2 also contract or collapse articles for final grouping and deposit.

Thus Transfer #1 reciprocates back and forth along the x-axis and moves articles A from pick-up station 38 into intermediate station 30 while Transfer #2 reciprocates back and forth along the X-axis between intermediate station 30 and a deposit location over discharge bucket conveyor 14.

Thus from the viewpoint of aligned articles across the pick-up station 38 of infeed 12, articles are lifted, expanded apart, deposited in rotatable trays in an intermediate station, rotated as desired, lifted from the trays, collapsed toward one another, then deposited in a discharge bucket conveyor in a formed group.

The discharge conveyor 14 is indexed or speed controlled to present sufficient respective empty conveyor buckets under Transfer #2 to receive articles from respective grippers 2-1, 2-2, 2-3, 2-4 in desired groups in buckets.

It will be appreciated that this motion of Transfers #1 and #2, back and forth along the x-axis is consistent, while the expansion and collapsing of the gripper sets and the rotation of respective trays 31-34 varies depending on the actual articles, or absence thereof, sensed in the infeed lanes 16-19 and the intended article group formation in the DISCHARGE FLOW direction (arrow C). Thus article groups are fully formed and discharged without voids or holes or incomplete article groups and with complete article count in each group. Inconsistent article infeed and desired article orientation for group forming are both accommodated.

Exemplary Operation

It will be appreciated that the presence or absence of articles in lanes across the infeed 12 can be identified by assignment of pattern designations or pattern styles. Thus in a multiple lane infeed such as infeed 12, the presence of an article at a designated pitch position in a line can be symbolized with a "1" while the absence of an article a at position in a lane can be designated by a "0". Thus in a four lane infeed 12, such as in FIG. 1, the pattern designation of articles "A" at pitch position P-1 is "1111" where there is an article in each lane 16-19. In the next pitch position, P-2, there is no article in lane 19, thus the article pattern designation or style at that position is 1110. And at position P-3, just upstream of article pick-up station 38, where there is no article in lane 18, the article pattern designation is 1101. And so on for the article pattern designations of each position across the infeed 12.

For purposes of the following exemplary operations the article pattern at pick-up station 38 under the grippers of Transfer #1 is followed through the transfers to the discharge bucket conveyor.

The following operating examples are not limiting in the infeeding product patterns which can be handled by this apparatus 10, and as noted the examples follow the handling of articles in the patterns in which they appear at the pick-up station 38.

Turning now to FIGS. 5A-5E the transfer articles A in a pattern style 1001 at pick-up station will be described.

Figure 5A:
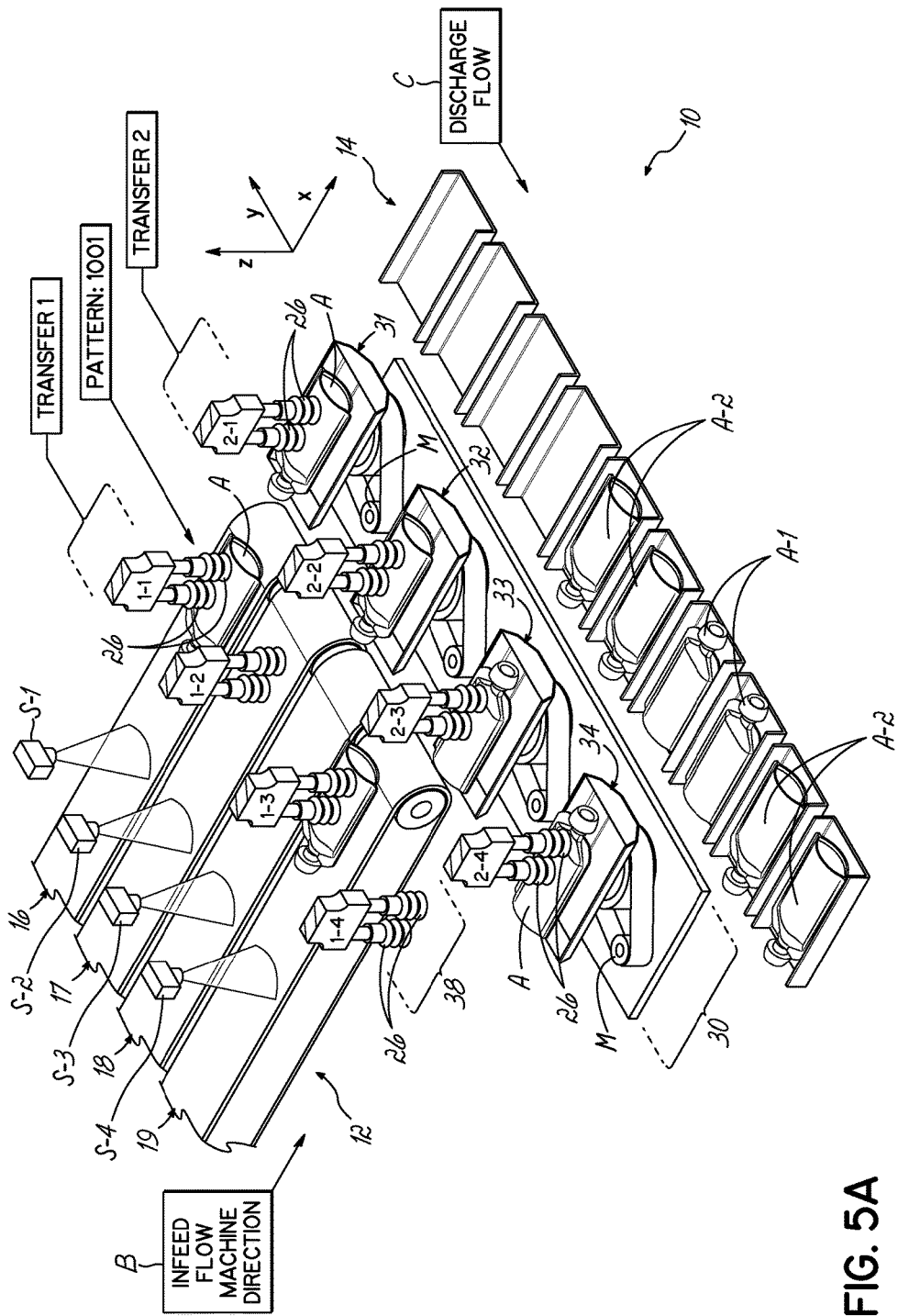
FIG. 5A-5E are illustrative isometric views of features of the apparatus of FIGS. 1 and 2 and illustrating its use in handling one exemplary article pattern styled 1001.

As shown in FIG. 5A, articles A are in pick-up station 38 (see FIG. 4) in a pattern 1001 with articles in lanes 16 and 19 but no articles in lanes 17, 18. Grippers 1-1 and 1-3 are moved along the y-axis direction over lanes 16, 19 and descend to pick these two articles from infeed 12. Grippers 1-2 and 1-4 do not engage any articles on infeed 12.

At the same time, four other articles A, previously in a pickup pattern 1111 preceding those two articles at station 38, have been transferred to trays 31-34 and trays 33, 34 have operated to turn articles thereon 180° for deposit to conveyor 14.

Figure 5B:
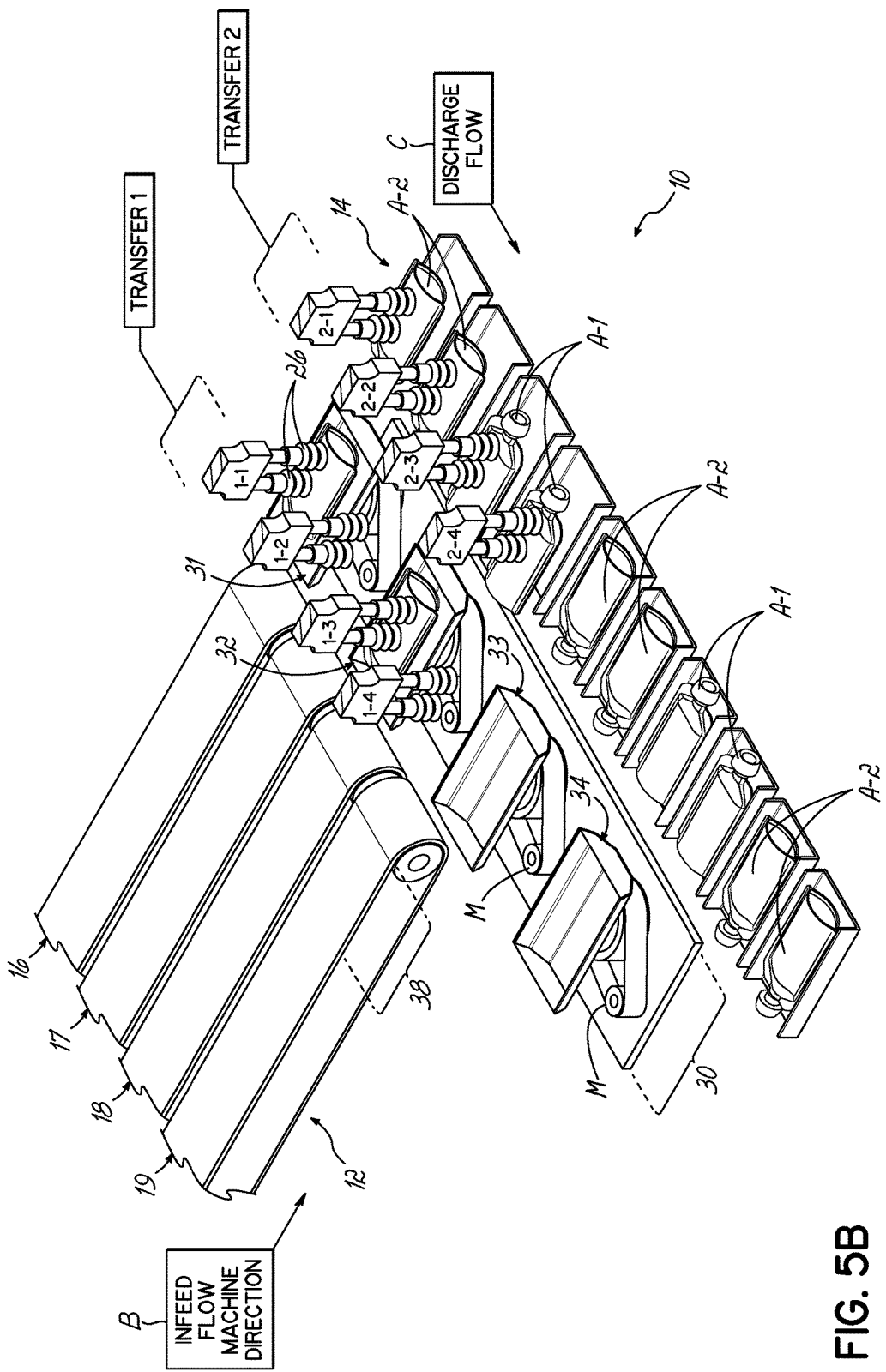

FIG. 5B illustrates the transfer by Transfer #1 of the two articles of pattern 1001 held by grippers 1-1 and 1-3 along the x-axis over trays 31 and 32. No turning of those is required.

When Transfer #1 moves over trays 31, 32, Transfer #2 moves from intermediate station 30 over conveyor 14 to place preceding four articles from pattern 1111 and into four empty buckets of conveyor 14.

Figure 5C:
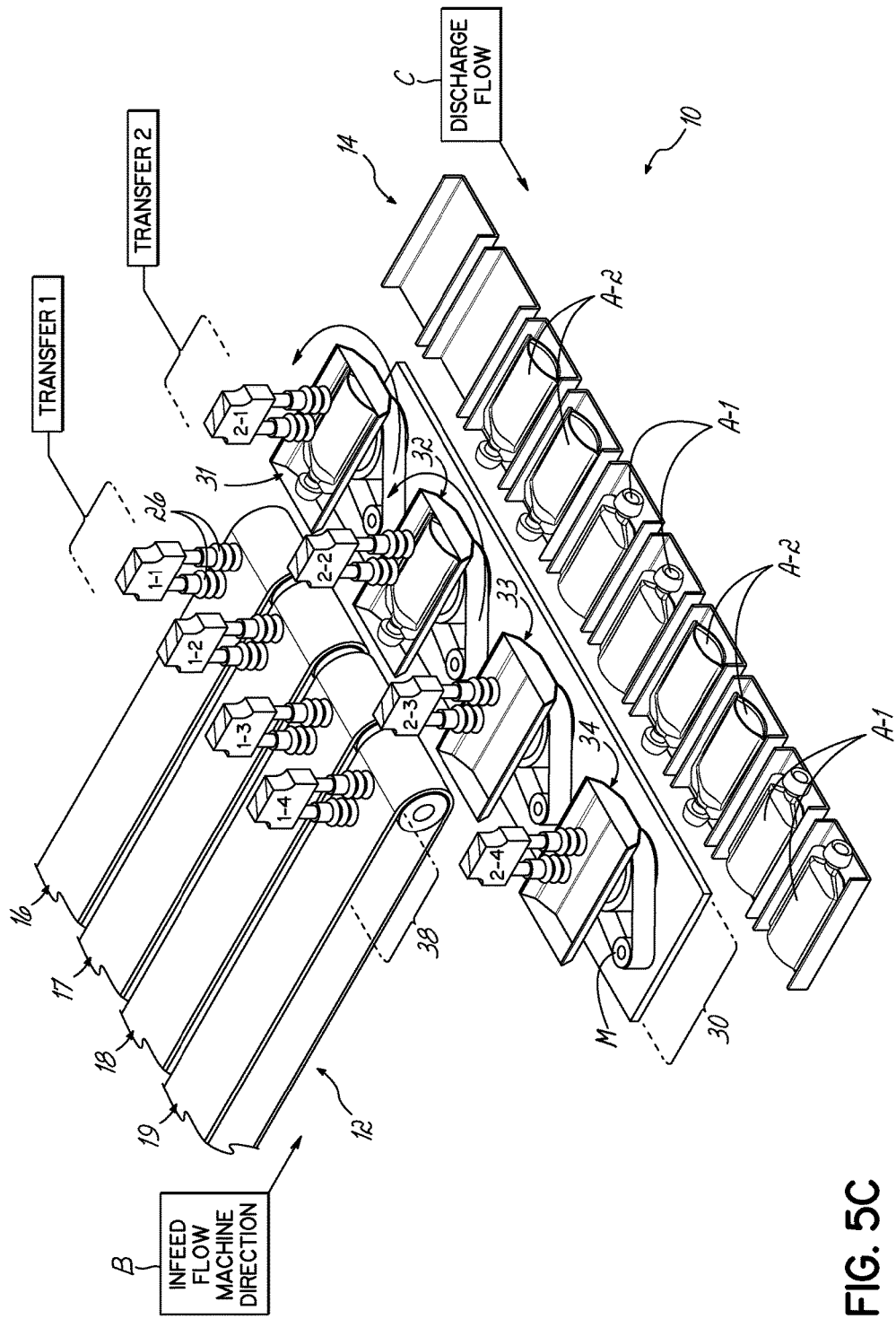
Figure 5D:
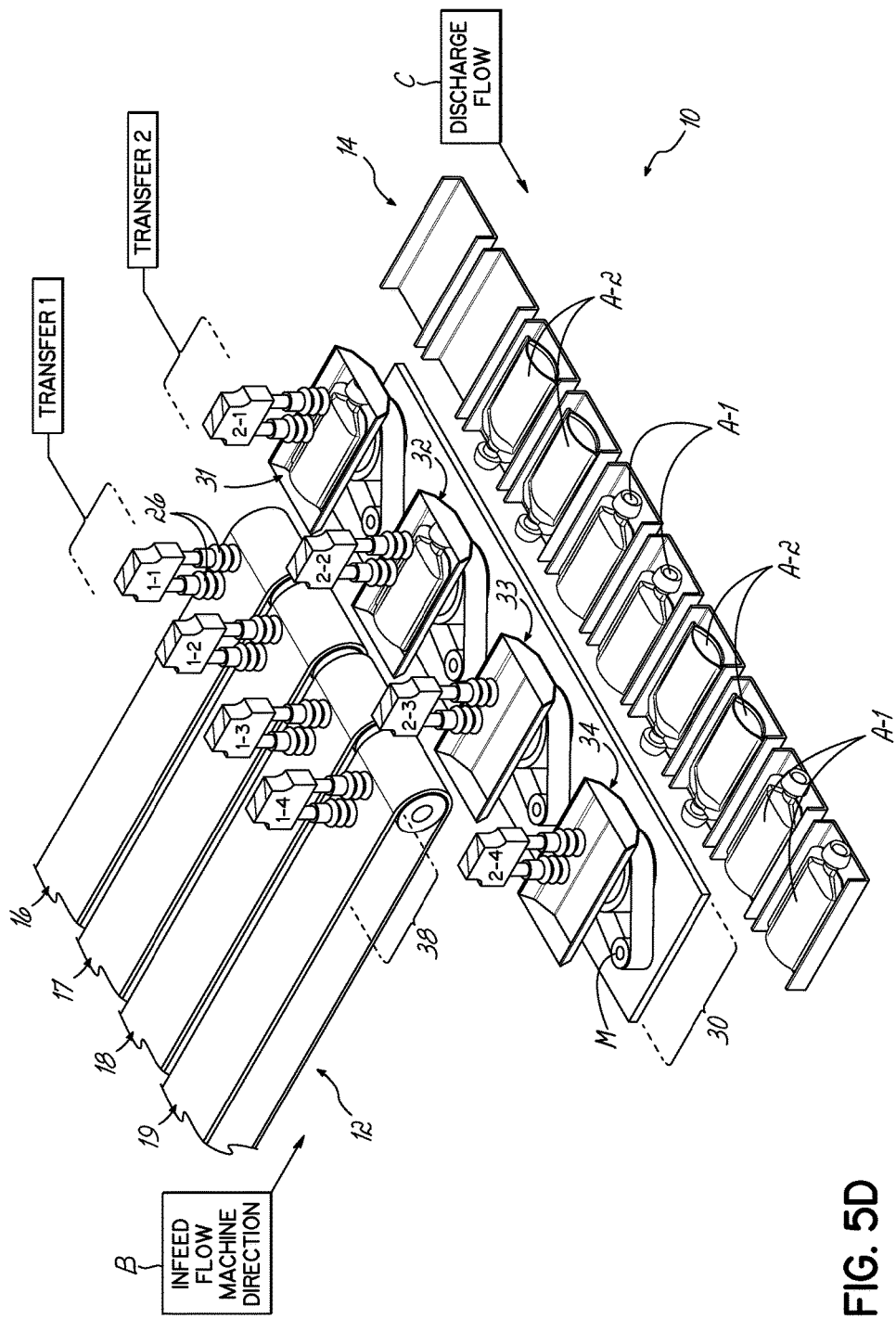

In FIG. 5C, conveyor 14 has been moved or indexed in discharge flow direction C to position two empty buckets for filling by the next operation of Transfer #2.

Trays have turned 180° to re-orient the two articles received from Transfer #1.

Figure 5E:
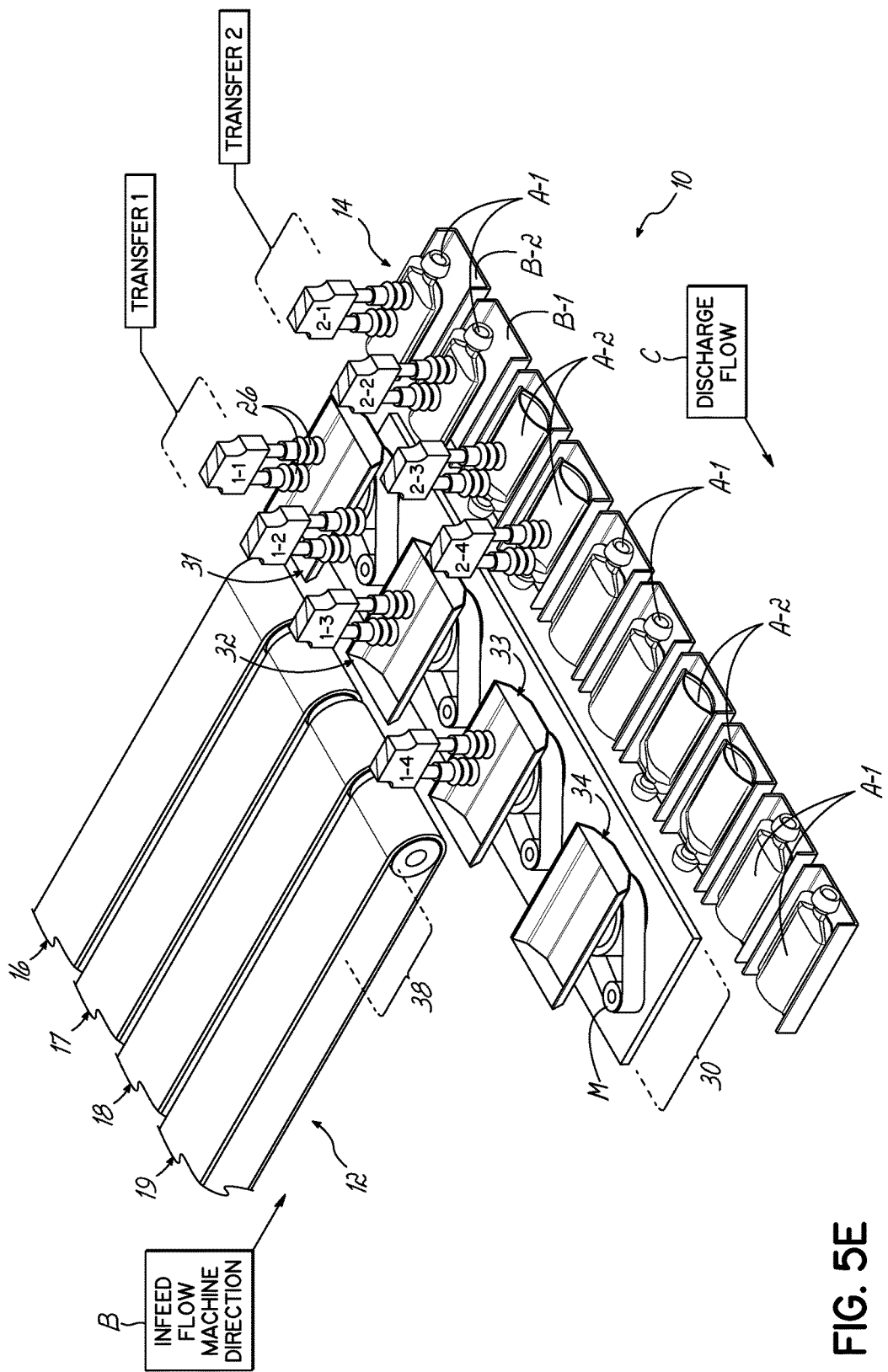

Thereafter (FIG. 5D) grippers 2-1 and 2-2 of Transfer #2 descend in a x-axis direction to engage the two articles in respective trays 31, 32 in FIG. 5E and have lifted and moved them in the x-direction over respective buckets B-1 and B-2 for deposit therein in the position or orientation of articles A-1 in a group of two like-oriented articles. The group of two such articles is complete, and follows a preceding two-article group from a prior pattern in conveyor 14.

After this deposit into conveyor 14, Transfers #1 and #2 return along an x-axis to a starting position with Transfer #1 over pick-up station 38 and Transfer #2 over intermediate station 30, all as in FIG. 5A.

Figure 6:
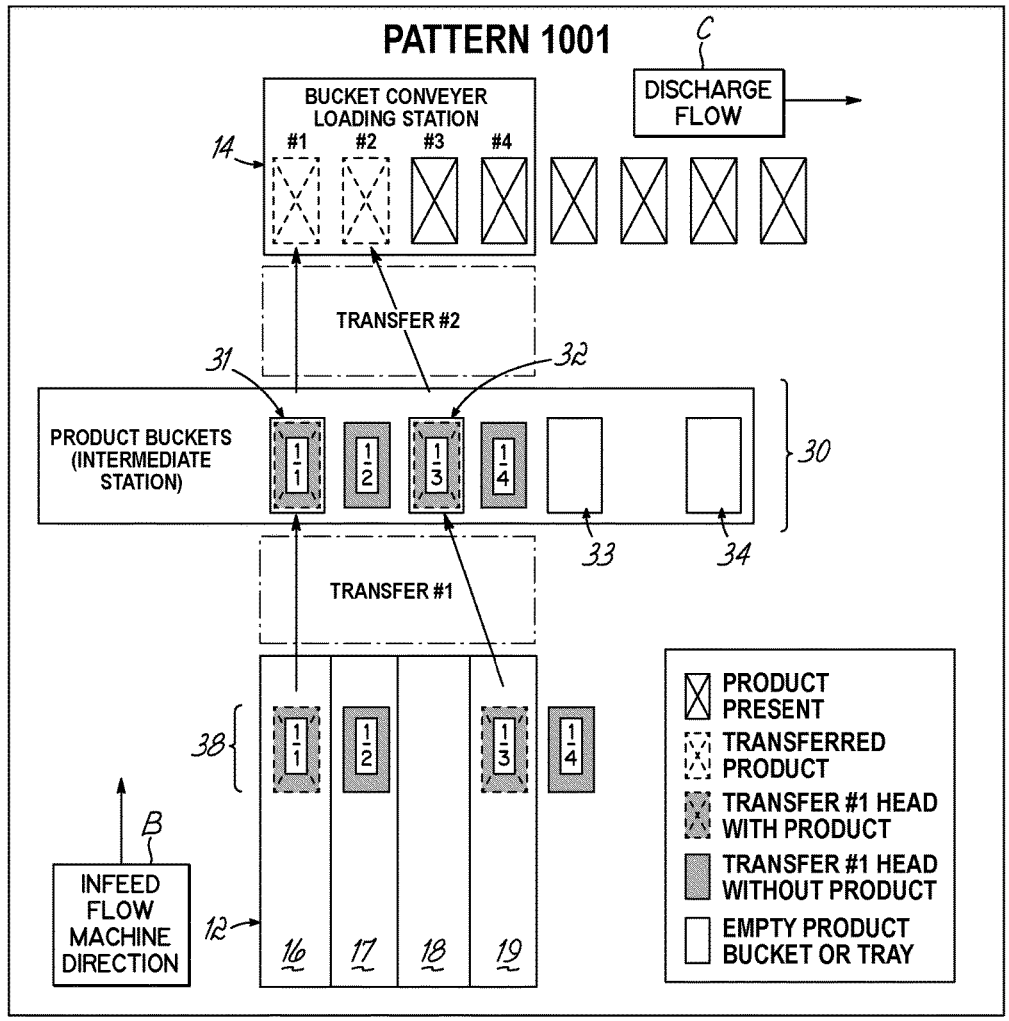
FIG. 6 is a diagrammatic view illustrating the operational steps of the apparatus of FIGS. 5A-5E.

FIG. 6 diagrammatically portrays a schematic of the transfer of articles in pattern or style 1001 at pick-up station 38.

In FIG. 6, having sensed articles in lanes 16 and 19, the grippers 1-2, 1-3 and 1-4 are positioned in station 38 as shown. Transfer #1 with grippers 1-1 and 1-3 deposit articles to tray 31 and tray 32 where they are turned and grippers 2-1 and 2-2 then transfer the articles to conveyor 14 in adjacent buckets as illustrated.

In these regards, it will be appreciated that the position of grippers of Transfer #1 are illustrated, but the grippers of Transfer #2 are omitted for clarity.

It will also be noted that in this exemplary embodiment, and in other operations of the invention, the respective grippers of Transfers #1 and #2 are positioned initially and through the process along the y-axis so as not to interfere one with the other, and as will be appreciated.

Turning now to FIGS. 7A-7E, an exemplary operation of apparatus 10 is illustrated for handling articles at pick-up station 38 in a pattern style 1011, with articles in infeed or supply lanes 16, 18 and 19, but no article in lane 17.

Figure 7B:
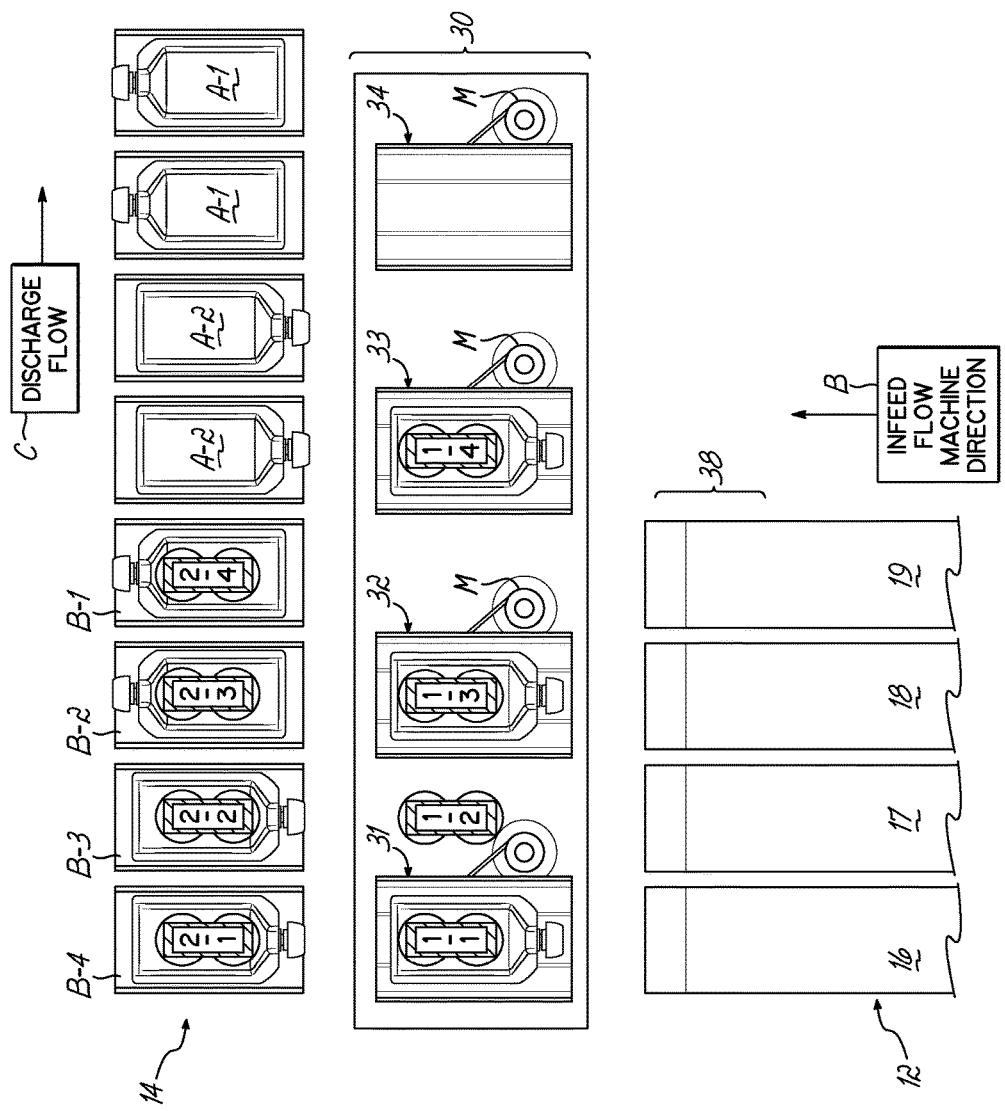

As illustrated in FIG. 7A, four preceding articles in trays 31-34 of intermediate orientation station 30 are shown, two articles on trays 33, 34 having been turned or re-oriented. Four empty buckets B-1, B-2, B-3 and B-4 are located to receive these articles in two groups of two articles each (FIG. 7B). Nevertheless, grippers 2-1, 2-2, 2-3 and 2-4 of Transfer #2 reside over trays 31-34 respectively while grippers 1-1, 1-2, 1-3 and 1-4 reside over respective lanes 16-19 at pick-up station 38.

In FIG. 7B grippers of Transfer #2 have moved over buckets B-1 to B-4 to place articles therein while grippers 1-1, 1-3 and 1-4 of Transfer #1 have moved along the x-axis over respective trays 31, 32 and 33 to place articles from pattern 1011 at station 30 therein.

In this case, gripper 1-4 has been expanded away from gripper 1-3 (y-direction) to position over tray 33. Gripper 1-2, without an article is positioned between trays 31 and 32.

Figure 7C:
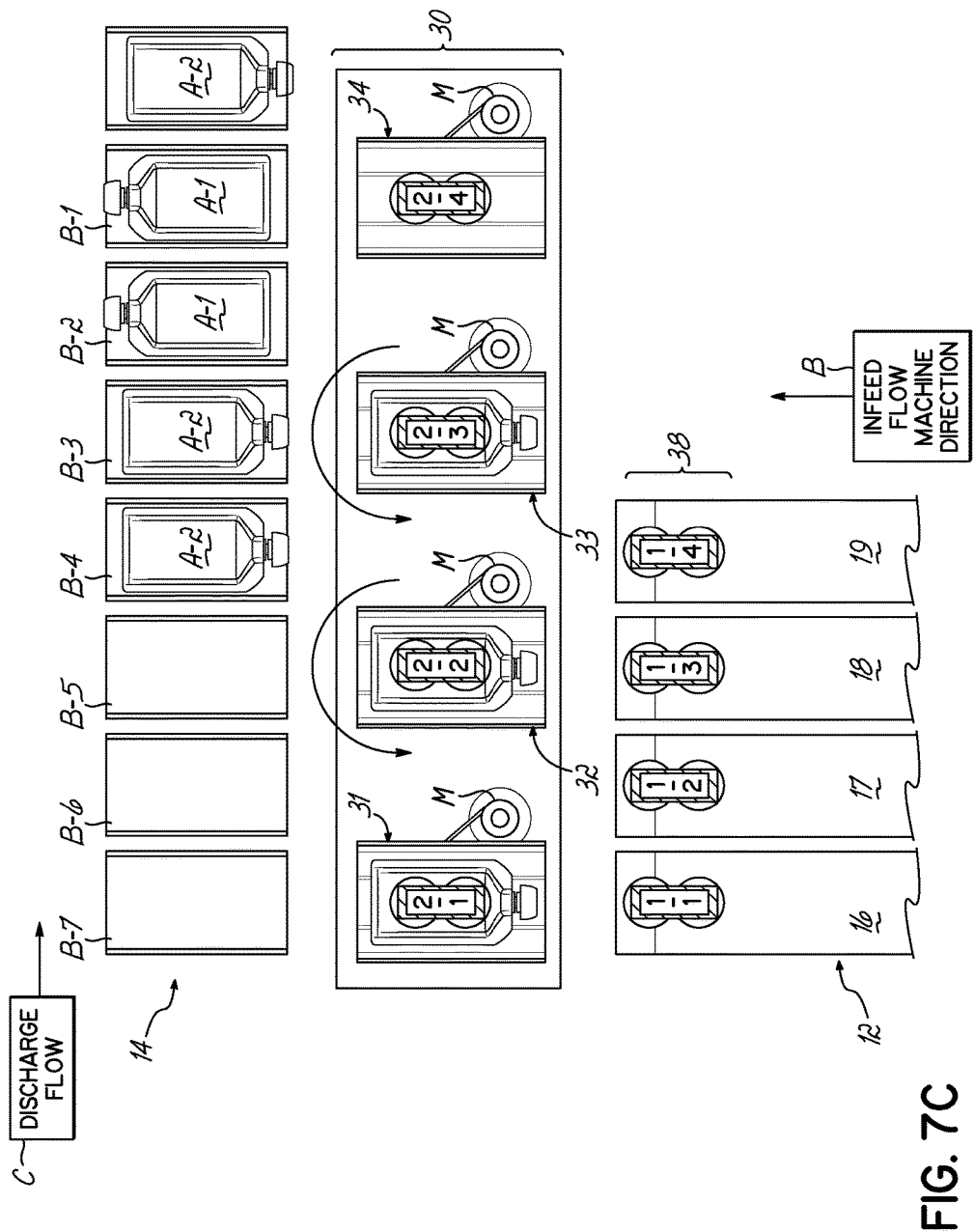

In FIG. 7C, conveyor 14 has been moved in discharge direction C to moved filled buckets B-1 to B-4 downstream and to position empty buckets B-5, B-6 and B-7 for receiving articles after re-orientation and transfer.

FIG. 7C also demonstrates rotation of trays 32 and 33 to re-orient articles thereon.

At this stage, grippers 1-1 to 1-4 have returned along an x-axis to position over station 38. Grippers 2-1 to 2-4 have expanded apart and returned over trays 31-34 of station 30.

Figure 7D:
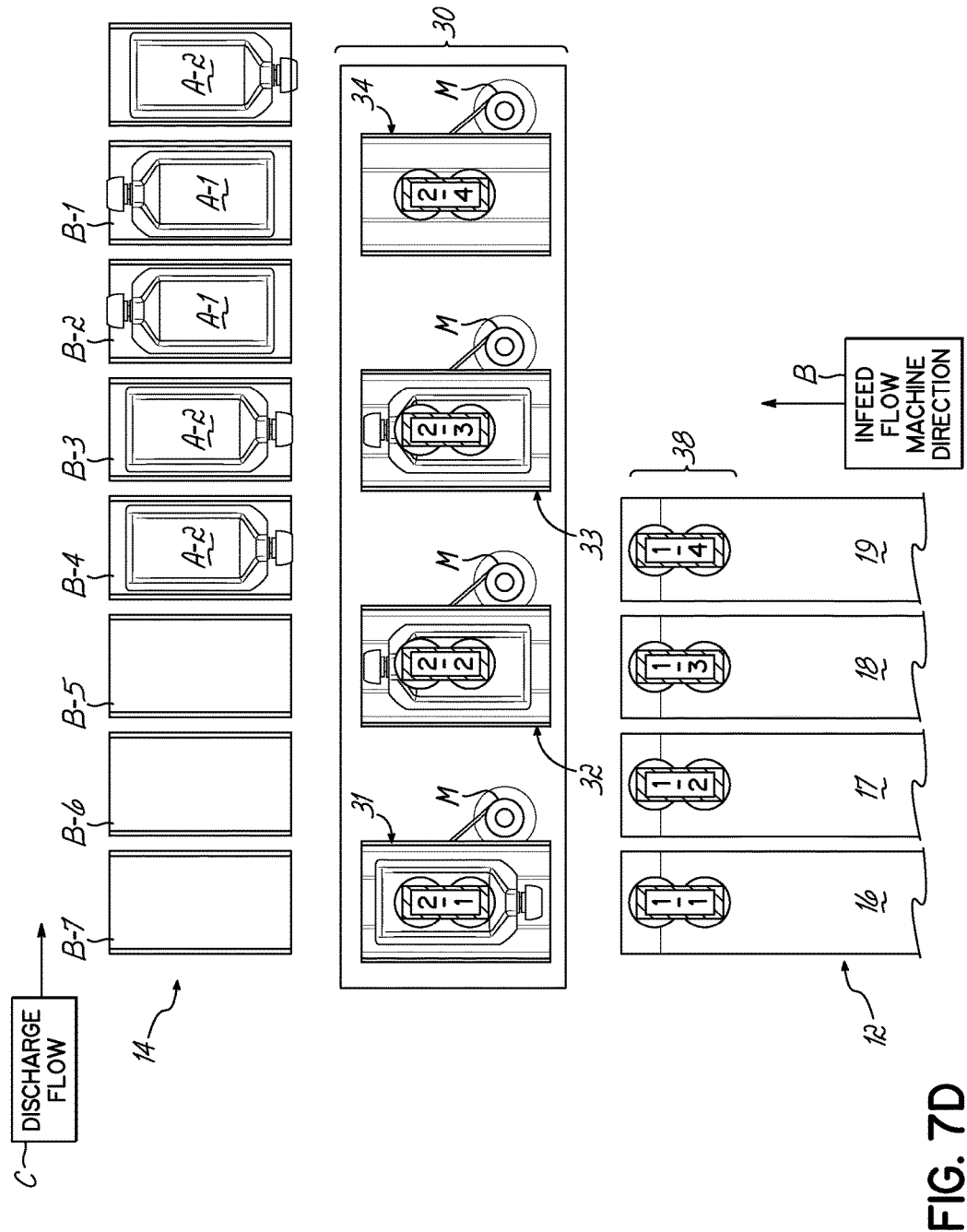

FIG. 7D illustrates grippers 2-1, 2-2 and 2-3 over filled trays 31, 32 and 33 respectively, the grippers of Transfer #2 having expanded apart from one another along the y-axis and wherein buckets B-1 to B-4 have indexed along the y-axis to ready empty buckets for filling with the next three articles now in trays 31-33 by the later collapsing grippers of Transfer #2.

Figure 7E:
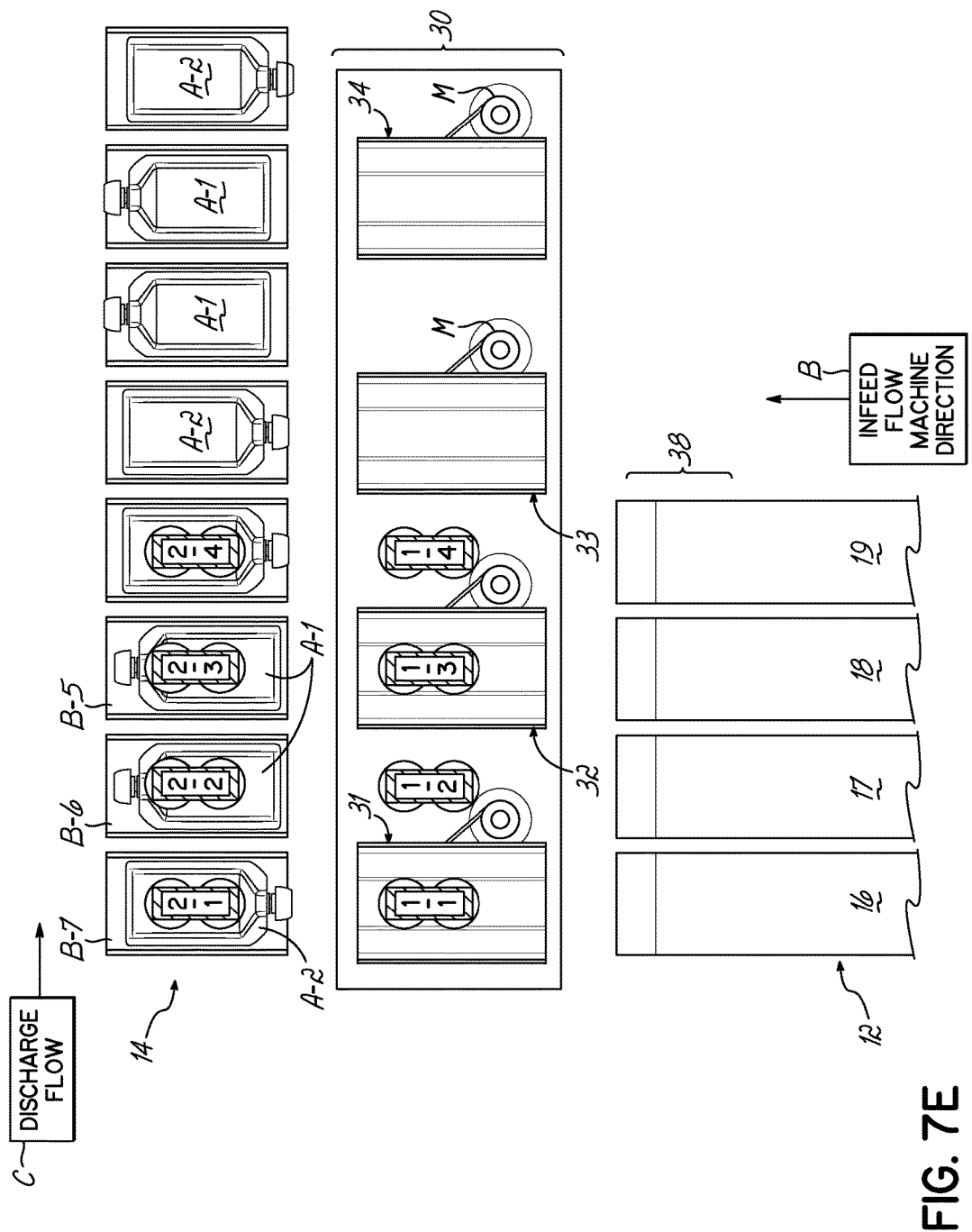

FIG. 7E illustrates the deposit of articles by grippers 2-1, 2-2, and 2-3 into respective buckets B-7, B-6 and B-5 of conveyor 14, while the grippers of Transfer #1 remain over station 30. Note that the grippers of Transfer #2 have collapsed in the y-direction toward one another to position the three articles for deposit in buckets B-5, B-6 and B-7. The re-oriented articles from trays 32, 33 have formed a two-article group with articles oriented alike, while the non-oriented article from tray 31 is deposited in bucket B-7 to be the first of two articles deposited in the next cycle. Gripper 2-4 is illustrated over the last article deposited in conveyor 14 from the last group of deposited articles. A succeeding transfer of another non-re-oriented article into the next following empty bucket (not shown) will complete the two-article group with the article now in bucket B-7 and with appropriate indexing of conveyor 14 for that purpose.

Thus in this process, grippers expand and contract with respect to each other to produce group forming with hole healing otherwise resulting from the start pattern 1011 of FIG. 7A.

Figure 8:
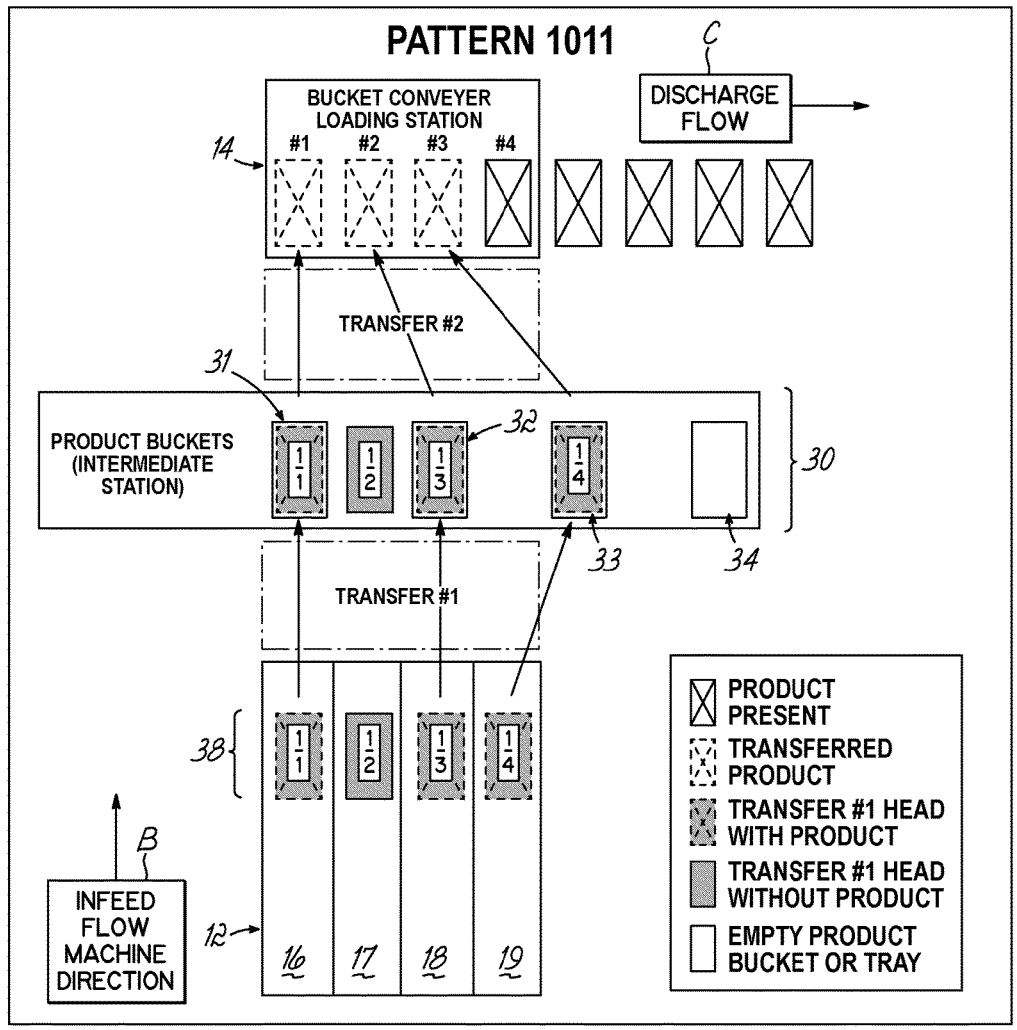
FIG. 8 is a diagrammatic view illustrating the function of the apparatus of FIGS. 1 and 2 as shown in FIGS. 7A-7E for article pattern 1011.

This is illustrated by the schematic operational diagram in FIG. 8 showing expansion of the articles by Transfer #1 for station 30, then contraction of the re-oriented and non-turned articles for the discharge conveyor, all by the respective grippers of Transfers #1 and #2.

Figure 9:
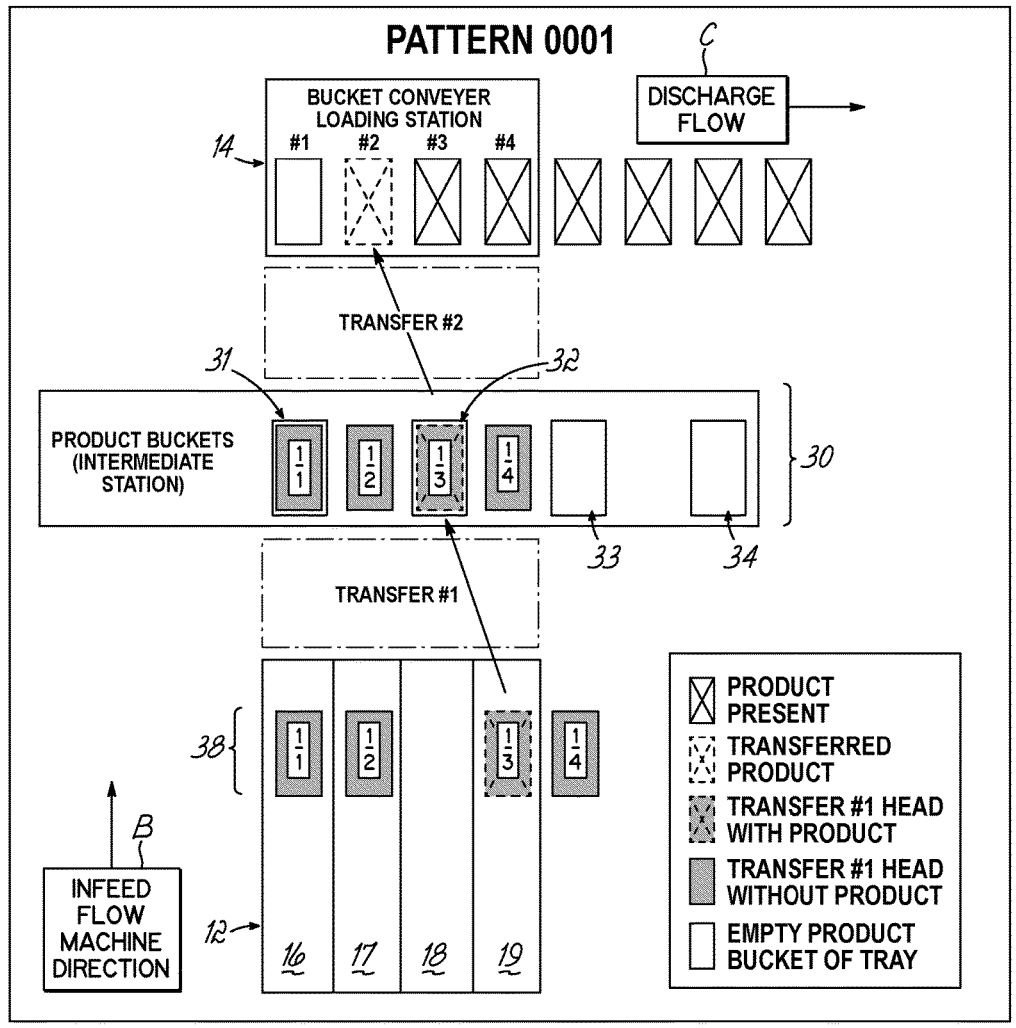
FIG. 9 is a diagrammatic view akin to FIG. 8 but illustrating schematically the function of the apparatus of FIGS. 1-2 when handling an article pattern styled 0001.
Figure 10:
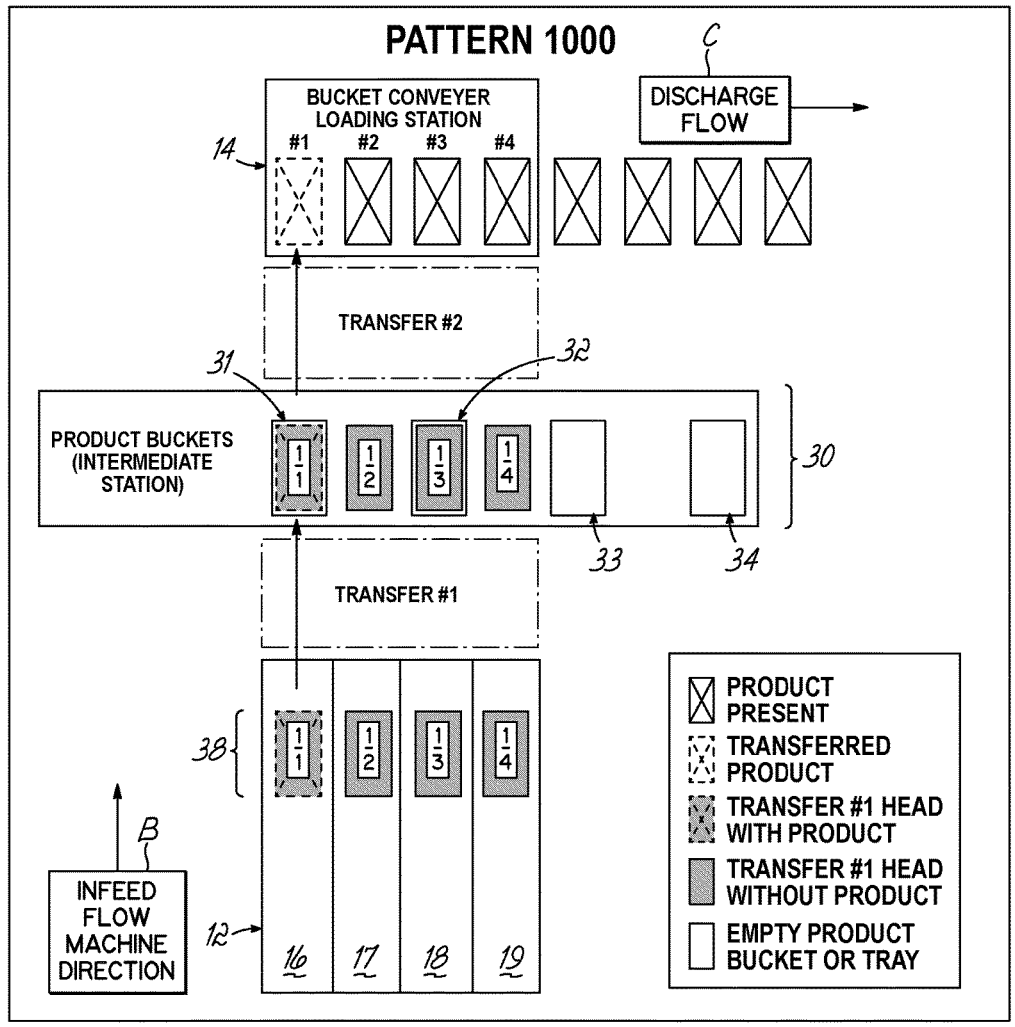
FIG. 10 is a diagrammatic view akin to FIGS. 8 and 9 but illustrating schematically the function of apparatus of FIGS. 1 and 2 when handling an article pattern styled 1000.
Figure 11:
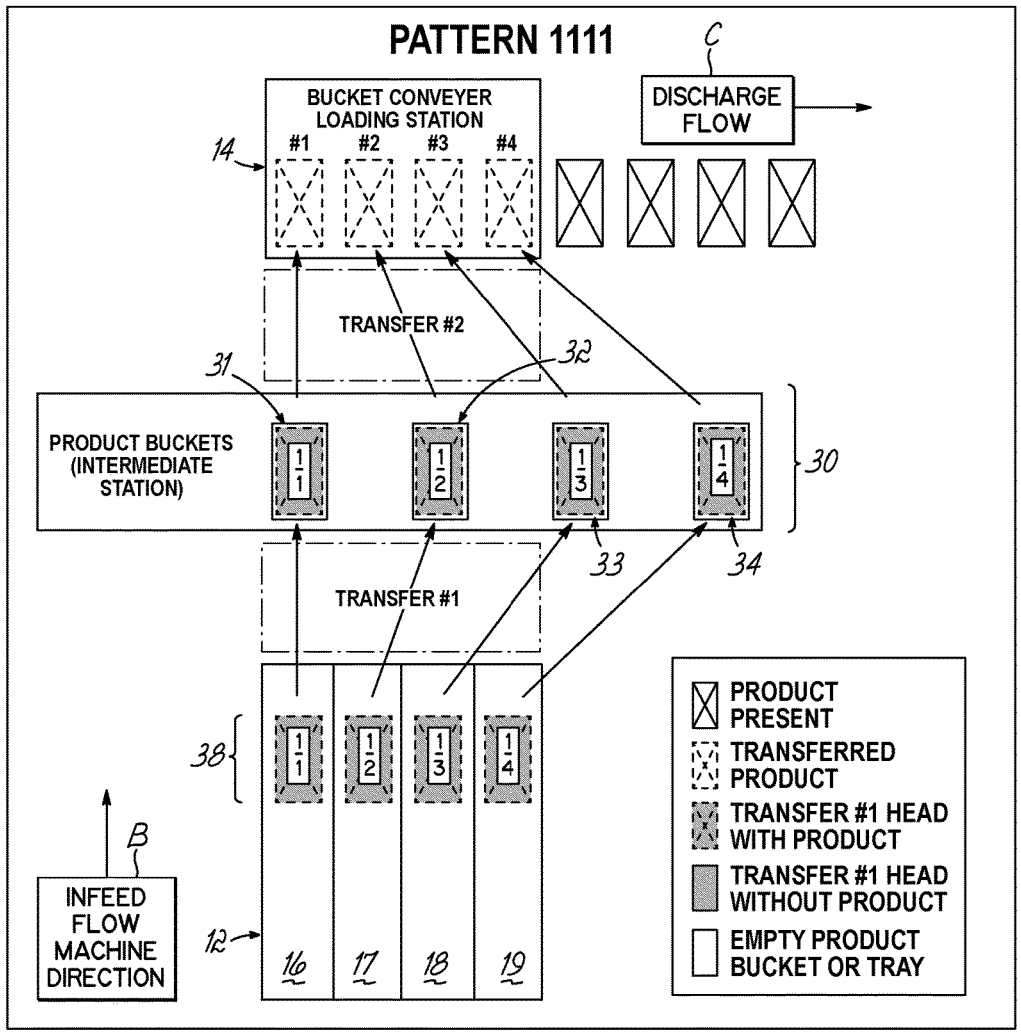
FIG. 11 is a diagrammatic view akin to FIGS. 8, 9 and 10 but illustrating schematically the function of the apparatus of FIGS. 1 and 2 when handling an article pattern styled 1111.

In similar fashion, FIGS. 9-11 illustrate schematically the operation of apparatus 10 for article patterns 0001, 1000 and 1111 at station 38 through to the discharge bucket stations. Each operation includes the respective Transfers #1 and #2, the intermediate station 30 and the bucket conveyor with components thereof operating similarly as described above but in appropriate combinations depending on the initial article pattern at station 38 and the adjacent patterns of articles preceding or following.

The bucket conveyor 14 is moved or indexed to present empty buckets for filling by Transfer #2 depending on the preceding load deposit and the next coming articles.

Complete groups are formed irrespective of the "hole" represented by absence of articles in the infeed lanes and irrespective of the patterns of articles at the pick-up stations. And the spacing of the trays 31-34 of intermediate station 30 accommodates article re-orientation irrespective of infeeding article orientations.

Figure 3:
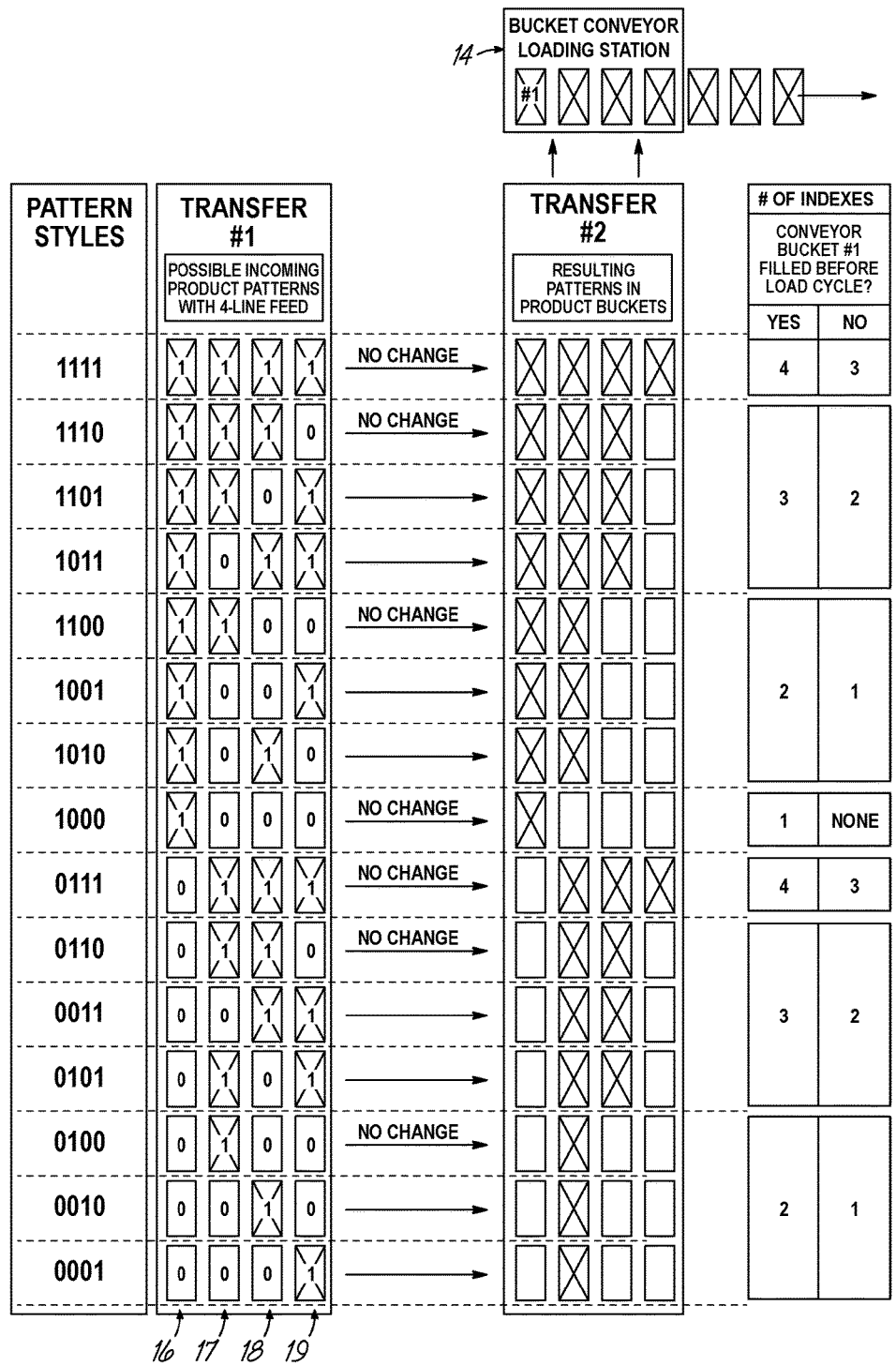
FIG. 3 is a plan view diagram illustrating operational steps of the apparatus of FIGS. 1 and 2 for various article patterns.

Turning now to FIG. 3, there is schematically illustrated therein parameters of operation of the invention facilitating understanding of the invention.

In particular, the left-most diagrammatic column of the Figure illustrates a variety of article patterns or styles as the articles appear at a pick-up station at the end of the infeed, with the pattern designation to the left of that, consistent with the "0" and "1" designation in the column. A "0" represents no article in the lane, while a "1" represents an article in the lane, all at the pick-up station.

The middle column of FIG. 3 represents the pattern of articles resulting at the end of the function of Transfer #2 into the bucket conveyor 14. Thus for example, articles of initial pattern 1101 at the pick-up station 38 eventually reside in side-by-side relation when deposited by Transfer #2. Articles in pattern 1011 also eventually reside side-by-side when deposited by Transfer #2.

The "no change" arrows between the left column and the central column indicate that the respective article position at pick-up station 38 is the same article position when transferred by Transfer #2. Arrows not identified by the "no change" designation mean that the article positions when transferred by Transfer #2 are different than when the articles appeared in the patterns at pick-up station 38 at the end of the infeed.

The right hand column of FIG. 3 demonstrates the indexing or positioning of conveyor 14 for each beginning pattern of articles when those articles are handled by Transfer #2. If there is an article in the last bucket, positioned for filing from previous deposits by Transfer #2, then for each original article pattern at station 38, when the articles are eventually transferred by Transfer #2, the bucket conveyor must be indexed or moved by the number of buckets (bucket pitches) or index positions indicated under the "yes" column.

If there is no article in the last bucket of the preceding bucket train, then the number of indexes is reduced by one as the list under the "no" column indicates.

It will be further appreciated that beginning down the left and center columns at patterns beginning at "0", no eventual deposit of articles can be performed by gripper 2-1. Since grippers 1-1 and 2-1 are preferably fixed, any attempt to re-position an article coming in from the second lane 17 will be impossible since the movement of any gripper 1-2 or 2-2 cannot be moved into a position occupied by gripper 1-1 or 2-1 respectively.

It will be appreciated that the schematic representation of FIG. 3 is related to a final grouping of articles in groups of 2. The invention as noted above can be modified to handle more or less infeed lanes and groups of more than two articles.

Also, and while single layer article groups are disclosed herein as examples, stacked articles or multiple article layers in groups can be provided by this apparatus, particularly given discharge conveyor control and sufficient article sensors.

Accordingly, the invention provides article groups with article re-orientation irrespective of article orientation in the article infeed or supply. As well the invention provides article group with full complement of articles with hole healing irrespective of inconsistent article infeed.

These and other embodiment alternatives and advantages will be readily apparent to those of ordinary skill in the art to which this invention pertains, and applicant intends to be bound only by the claims appended here to.

What is claimed is:

1. Apparatus for article handling and including:
   a multiple lane article supply conveyor for conveying articles to an article pick up station;
   a first plurality of article grippers;
   an intermediate article orientation station, said first plurality of article grippers moveable to pick articles from said pickup station and deliver articles to said intermediate article orientation station,
   a second plurality of article grippers, and
   an article discharge conveyor,
   said second plurality of article grippers moveable to pick articles from said intermediate article orientation station and deliver articles to said discharge conveyor.

2. Apparatus as in claim 1 wherein article grippers in said first plurality of article grippers are moveable toward and away from each other.

3. Apparatus as in claim 1 wherein article grippers in said second plurality of article grippers are moveable toward and away from each other.

4. Apparatus as in claim 3 wherein said first and said second plurality of article grippers are moveable in a reciprocal machine direction simultaneously with respect to each other.

5. Apparatus as in claim 1 wherein said intermediate article orientation station comprises a plurality of rotatable article trays for turning articles placed thereon for re-orientation.

6. Apparatus as in claim 5 wherein there are at least as many rotatable trays in said intermediate article orientation station as there are lanes in said multiple lane supply conveyor.

7. Apparatus as in claim 6 wherein said lanes are spaced apart, one from the other and said rotatable trays are spaced apart, one from the other further than the spacing between said lanes.

8. A process for article handling, said process including the steps of:
   feeding articles on a multiple lane article supply conveyor in a machine direction and to an article pick-up station in random patterns of articles at said pick up station;
   picking spaced apart articles at said pick-up station;
   expanding or contracting the spacing of picked articles in a direction transverse to said machine direction and moving said picked articles onto an intermediate article re-orientation station;
   turning at least one article in said intermediate article re-orientation station with respect to said machine direction,
   picking articles from said intermediate article re-orientation station;
   moving an article picked from said article re-orientation station toward another article picked from said article re-orientation station, and
   depositing articles picked from said article re-orientation station onto a discharge conveyor.

9. A process as in claim 8 including forming articles picked from said article re-orientation station into a group on said discharge conveyor.

10. A process as in claim 9 wherein said forming step includes forming articles with consistent numbers of articles into each group.

11. A process as in claim 10 including forming said each group independently of the number of articles in a pattern at said pick up station on said supply conveyor.

12. A process as in claim 8 including the step of picking articles from said pick-up station and moving articles to said intermediate article re-orientation station at the same time as articles are picked from said intermediate article re-orientation station and deposited onto said discharge conveyor.

13. A process as in claim 8 including the step of turning at least one article in said intermediate article re-orientation station while not turning another article in said intermediate article re-orientation station.

14. A process as in claim 8 wherein said picking of respective articles at said pick-up station and in said intermediate station includes moving said picked articles in a vertical direction.

15. A process as in claim 8 including the step of moving articles picked at said pick-up station and thereafter depositing articles onto said discharge conveyor in three directions of motion.

16. A process as in claim 15 including the step of turning articles about a vertical axis of rotation in a fourth direction of motion.

17. A process as in claim 8 including the further steps of moving said supply conveyor at one of an intermittent and continuous motion and of moving said discharge conveyor in one of an intermittent and continuous motion.

18. A process as in claim 8 including the step of depositing articles onto a discharge conveyor where article orientation varies from one to another.

\* \* \* \* \*